Aug. 16, 1932.    M. ROMANO ET AL    1,872,095
WINDSHIELD CLEANER DEVICE
Filed April 6, 1931
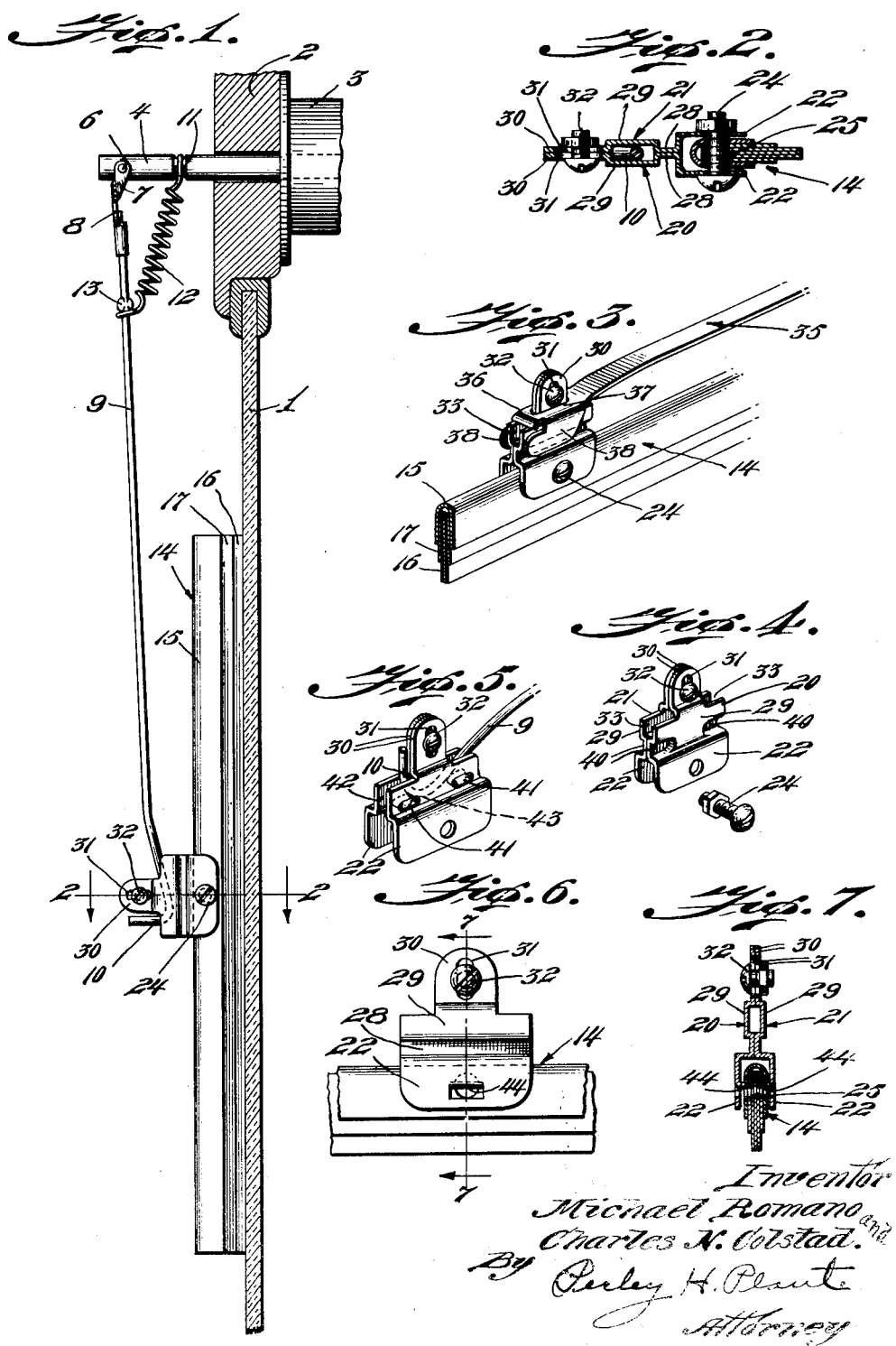

Patented Aug. 16, 1932

1,872,095

UNITED STATES PATENT OFFICE

MICHAEL ROMANO, OF PROVIDENCE, RHODE ISLAND, AND CHARLES N. COLSTAD, OF ATTLEBORO, MASSACHCUSETTS; SAID COLSTAD ASSIGNOR TO SAID ROMANO

WINDSHIELD CLEANER DEVICE

Application filed April 6, 1931. Serial No. 527,980.

This invention relates to windshield cleaner devices and more particularly to a new and improved form of attaching means for securing a wiper blade to the wiper arm.

One object of the invention is to provide an improved attaching means of this character which is capable of use interchangeably with different types of wiper arms so as to render it capable of use without change in connection with various forms of wiper arms now in use upon automobiles.

Another object of the invention is to provide a simple and efficient device of this character which is capable of use generally with various forms of wiper blade now in use, and which is adapted to permit a certain amount of lateral tilting movement on the part of the wiper blade as it moves back and forth across the windshield glass.

Other objects and advantages of the invention relate to various improved details of construction and novel arrangements of the parts as will be more fully set forth in the detailed description to follow.

Referring to the drawing:

Fig. 1 is a vertical sectional view taken through the windshield of an automobile and showing the operative parts of the windshield cleaner mechanism in side elevation, Fig. 2 is a sectional view, taken through the wiper blade and attaching means substantially along the line 2—2 of Fig. 1, Fig. 3 is a perspective view of one form of the improved attaching means, showing the same as it appears when employed in connection with another form of wiper arm.

Fig. 4 is a disassembled perspective view of a somewhat modified form of attaching means, Fig. 5 is a perspective view of another modified form of attaching means, Fig. 6 is a side elevational view of a further modified form of attaching means showing the same as applied to a wiper blade, and, Fig. 7 is a sectional view, taken substantially along the line 7—7 of Fig. 6.

In the embodiment of the invention illustrated herein, 1 designates an automobile windshield glass and 2 the windshield frame, which supports a motor 3 of any suitable type, the motor being provided with a shaft 4 extending through the frame 2 for operating the windshield cleaner mechanism.

The shaft 4 is provided with a transverse opening adapted to receive a bolt or screw 6 which is passed through the spaced arms 7 of a clip 8, the clip 8 being firmly secured to a wiper arm 9 which is formed from a round wire and has a bent end portion 10 shaped to engage a wiper blade supporting means. The shaft 4 may be provided with an annular groove 11 adapted to receive the bent end portion of a coiled tension spring 12 the opposite end of which engages the wiper arm adjacent to enlargements 13 formed thereon, whereby the wiper arm is resiliently urged towards the windshield glass in such a manner as to press a wiper blade carried thereby into operative contact with the windshield glass. In the embodiment of the invention illustrated herein a wiper blade 14 is carried by the wiper arm and comprises a channel shaped metal strip 15 which is adapted to support a plurality of relatively thin rubber wiping plies 16 together with one or more supporting plies 17 arranged upon opposite sides of the wiping plies 16 and interposed between the wiping plies and the adjacent sides of the holder 15.

The blade attaching means as shown in Figs. 1, 2 and 3 of the drawing comprises two similarly formed symmetrical plates 20 and 21 provided with lower portions 22 which are adapted to be spaced from each other a sufficient distance to receive the wiping blade 14 therebetween in such a manner as to permit the wiping blade to tilt laterally from one side to the other in its movement across the windshield glass. A bolt 24 is passed through the oppositely positioned spaced portions 22 of the plates and through an opening 25 formed in the blade, the opening 25 being of sufficient size to permit the wiper blade to tilt freely and to a limited extent relative to the attaching means. The attaching plates 20 and 21 are each provided with an inbent channel shaped portion 28 located adjacent to the spaced portions 22 and the channel portions 28 are so positioned that they engage each other when the plates are arranged and held in operative positions. Portions of the plates 20 and 21 located upon the opposite sides of the channel shaped portions 28 from the spaced portions 22 are so formed as to be spaced from each other, as at 29, when the parts are in their operative positions but preferably to a somewhat less extent than the portions 22, in order to permit the insertion therebetween of the bent end 10 of the wiper arm 9 and to engage and substantially grip the bent end portion 10 when the parts are in their operative positions.

Each of the plates 20 and 21 is provided with a narrowed portion 30 located upon the opposite side of the portion 29 from the channel shaped portion 28, and these narrowed portions 30 are struck inwardly so as to engage each other when the parts are arranged in operative position. The narrowed portions 30 are provided with elongated registering openings 31 adapted to receive a suitable bolt 32 for holding the plates 20 and 21 in operative position relative to each other. The spaced portions 29 of the plates 20 and 21 being of greater width than the narrowed portions 30, provide open channels 33 at each end of the attaching means, as best shown in Figs. 3 and 4 of the drawing, to permit certain parts of the bent end 10 of the wiper arm, 9, to lie therein when the parts are in assembled position.

In Fig. 3 of the drawing the attaching mechanism is shown in connection with another form of wiper arm which is indicated generally by 35, and which comprises an end portion 36 provided with a narrow slot 37 within which the narrowed portions 30 of the attaching plates are adapted to be received prior to the insertion of the bolt 32. This form of wiper arm is also provided with oppositely positioned inturned portions 38 which are adapted to overlie the spaced portions 29 of the plates when the parts are in assembled position.

In that form of the attaching mechanism shown in Fig. 4 of the drawing, relatively short depressions 40 are formed in the opposite side edges of the plates 20 and 21, which depressions extend only partially across the width of the plates and which are so arranged that the corresponding depressions of each plate engage each other in the operative position of the parts whereby the spaced portions 22 and 29 of the attaching plates are maintained in proper spaced relation with each other when the parts are in assembled position and are secured to each other by the bolt 32. In this as in the preceding form of the invention the attaching mechanism may be employed either in connection with a wiper arm 9 formed of a round rod or wire or may be employed in connection with a wiper arm of the type designated by the reference character 35.

In that form of the invention shown in Fig. 5 of the drawing, the plates 20 and 21 are provided with relatively short correspondingly positioned depressions 41, which instead of being so formed as to extend to the side edges of the plates 20 and 21, as in Fig. 4, are spaced from the edges of the plates so that the side edges of the widened portions of the plates 20 and 21 are spaced from each other throughout their extent. By forming the plates 20 and 21 in this manner, the correspondingly positioned depressions 41 in the plates 20 and 21 engage each other to maintain the spaced portions 22 of the plates properly positioned to receive the wiper blade and provide spaces 42 adjacent thereto at the side edges of the plate which permit greater tilting of the blade in the direction of its length. The manner of positioning the depressions 41 also permits the bent end portion 10 of the wiper arm 9 to be positioned partially between the depressions 41 and to contact with one or both of the depressed portions as shown at 43, whereby the wiper arm is more firmly held between the spaced portions 29 of the plates when the bolt 32 is tightened.

In that form of the invention illustrated in Figs. 6 and 7 of the drawing the attaching mechanism is similar in all respects to that shown in Figs. 1 to 3 of the drawing except that instead of employing a bolt 24 passed through registering openings in the spaced portions 22 of the plates 20 and 21, portions of the spaced walls 22 are struck inwardly to form tangs 44 so arranged as to be oppositely positioned relative to each other and to enter the opening 25 formed in the wiper blade and thus support the wiper blade in such a manner as to permit it to tilt laterally in its movement across the windshield glass when the plates 20 and 21 are secured together and held in operative position by means of the bolt 32.

It will be understood that in each form of the attaching mechanism as shown and described the mechanism is adapted for use either in connection with a wiper arm 9 as shown or with a wiper arm of the general type as indicated by the reference character 35, and it will be seen also that the bent end portion 10 of the rod 9 when used in connection with any of the various forms of attaching means shown herein is adapted to lie within the channel formed by the off-set portions 29 of the plates and be engaged and substantially securely held thereby when the plates are maintained in their operative positions relative to each other by means of the bolt 32.

In each form of the invention the elongated form of the openings 31 in the narrowed portions 30 of the plates 20 and 21 permit the bolt 32 to be raised so as to provide ample room for the end portion 26 of the wiper arm 35 when that form of wiper arm is employed, while they permit the bolt 32 to be lowered when the wiper arm 9 is employed, whereby the spaced portions 29 of the plates may be drawn more securely into binding engagement with the bent in portion 10 of the wiper arm and the parts more securely held against movement.

While we have shown and described various arrangements of cooperating depressed portions 28, 40 and 41 as located intermediate the off-set portions 22 and 29 of the plates 20 and 21 it is to be understood that the invention is not confined to any particular form, shape or extent of these depressions and that they may extend entirely across the transverse extent of the plates or be limited to portions adjacent the transverse edges thereof, or may in fact be formed entirely within and spaced from the side edges of the plates as may be found most desirable or convenient in practice.

What we claim is:—

1. A windshield cleaner structure comprising a wiper arm, a wiper blade, an attaching means for connecting the wiper blade to the wiper arm comprising symmetrical connecting plates each of which is provided with one or more correspondingly arranged depressed portions adapted to contact with each other in the operative position of the parts, and each provided with a portion adapted to be spaced from each other to receive therebetween a windshield wiper blade, means for supporting the blade between said spaced portions, portions of less length than said spaced portions and shaped to contact with each other and positioned upon the side of said first named contacting portions opposite to said spaced portion, and means for holding said shorter portions in firm engagement with each other in the operative position of the parts.

2. In a windshield cleaner structure, a wiper arm, a wiper blade, attaching means for securing the wiper blade to the wiper arm comprising separate opposed plates cooperating with each other and each provided with opposed cooperating portions spaced from each other to receive the wiper blade, spaced cooperating portions adapted to receive and engage the end portion of the wiper arm, and spaced oppositely positioned depressions formed in each plate and so arranged that the corresponding depressions of each plate will engage each other in the operative position of the parts and provide a shallow recess located therebetween for the reception of a portion of the end of the wiper arm, and means for holding the opposed plates in operative position and in engagement with opposite sides of the end of the wiper arm.

3. An attaching means for windshield wiper blades comprising separate opposed plates having portions thereof spaced from each other to receive a wiper blade therebetween, and having oppositely positioned contacting portions located adjacent to said first named spaced portions, spaced portions located upon the opposite side of said contacting portions from said first named spaced portions, and contacting portions located upon the opposite side of said second named spaced portions from said first named contacting portions, said last named contacting portions being shorter than the remaining portions of said plates to fit within a slot formed in a wiper arm, and means adjustably connecting said last named contacting portions for holding the plates against separation and for retaining the plates in position relative to the wiper arm.

4. An attaching means for windshield wiper blade comprising separate opposed plates having portions spaced from each other to receive therebetween a wiper blade, contacting portions spaced from each other laterally of said first named spaced portions, and oppositely positioned spaced portions located between said spaced contacting portions and adapted to receive therebetween a portion of a wiper arm, the outermost of said contacting portions being provided with elongated slots and having fastening means adjustably mounted in the slots for holding the plates against separation from a wiper arm.

5. A windshield cleaner structure comprising a wiper arm having a portion adapted for attachment to a wiper blade supporting means, a wiper blade, means for connecting said wiper blade and wiper arm comprising oppositely positioned symmetrical plates having contacting portions laterally spaced from each other and off-set portions laterally spaced from each other to receive a portion of the wiper blade and a portion of the wiper arm respectively, and means connecting the outermost of the contacting portions of said plates for releasably securing said plates to a wiper arm in two operative relations therewith.

6. An attaching means for windshield wiper blades adapted for use in connection with varying types of wiper arms, comprising cooperating plate members having means for supporting a wiper blade and provided with opposed spaced portions for receiving a portion of a wiper arm and opposed contacting portions for fitting within an opening in a modified form of wiper arm, and a single means for detachably securing said plates to either of said wiper arms.

7. An attaching means for windshield wiper blades comprising a clip member having means for supporting a wiper blade and provided with oppositely positioned portions spaced from each other to receive therebetween a portion of a wiper arm, and contacting portions adapted for insertion within an opening in a wiper arm, and means passed through the contacting portions of said clip for holding a wiper arm against removal from said contacting portions or drawing the spaced portions into engagement with a portion of a wiper arm interposed therebetween.

8. In a means for attaching a windshield wiper blade to wiper arms, a clip means comprising spaced portions for receiving and supporting a wiper blade, spaced portions providing a recess for the insertion and removal of a portion of a wiper arm, and contacting portions of less length than the remaining portions of said clip means forming a tongue, and means connecting said contacting portions for drawing said second named spaced portions into engagement with a portion of a wiper arm interposed therebetween.

In testimony whereof we have affixed our signatures.

MICHAEL ROMANO.
CHARLES N. COLSTAD.